F. SCHMID.
FILM PACK ADAPTER.
APPLICATION FILED JAN. 11, 1913.

1,073,442.  Patented Sept. 16, 1913.

WITNESSES
George Du Bou
[signature]

INVENTOR
FREDERICK SCHMID
BY
[signature]
ATTORNEYS

UNITED STATES PATENT OFFICE.

FREDERICK SCHMID, OF NEW ROCHELLE, NEW YORK, ASSIGNOR TO C. P. GOERZ AMERICAN OPTICAL CO., OF NEW YORK, N. Y., A CORPORATION OF NEW YORK.

FILM-PACK ADAPTER.

1,073,442. Specification of Letters Patent. Patented Sept. 16, 1913.

Application filed January 11, 1913. Serial No. 741,379.

*To all whom it may concern:*

Be it known that I, FREDERICK SCHMID, a subject of the German Emperor, residing at New Rochelle, Westchester county, State of New York, have invented certain new and useful Improvements in Film-Pack Adapters, of which the following is a specification.

My invention relates to adapters, to be used in connection with photographic cameras, where it is desired to conveniently and securely hold film packs of the well known type, now largely used, comprising flat individual films stacked one upon another, provided with film manipulating tabs and made up into packages. A film pack of this general type is shown, for example, in patent to Hutchings and Robertson 728,718, dated May 19, 1903.

The object of my invention is to provide an adapter for the purpose aforesaid into which a film pack may be easily and quickly inserted, in which said pack may be securely held and the individual films safely exposed and manipulated, and from which the pack after exposure may be easily and quickly removed.

A further object of my invention is to provide an adapter as aforesaid, which is light, simple and inexpensive of construction, and in which the various parts are at all times securely held together against loss.

A still further object of my invention is to provide an adapter as aforesaid in which the relative movement of its component parts is confined within very small limits, while being manipulated in connection with the film pack.

My invention will be better understood by reference to the accompanying drawings which show a preferred form thereof.

Figure 1:
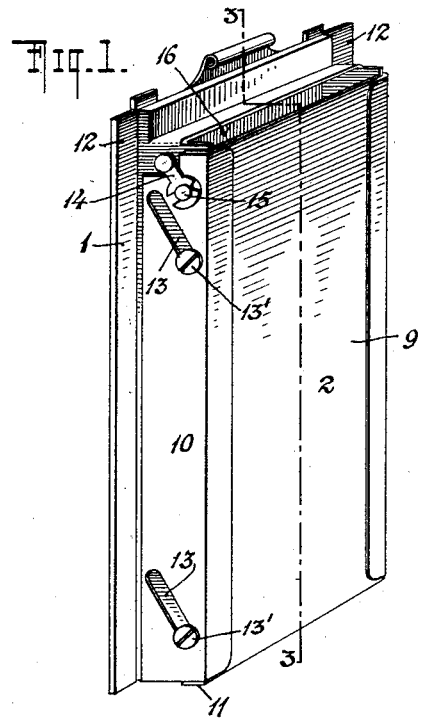
Figure 2:
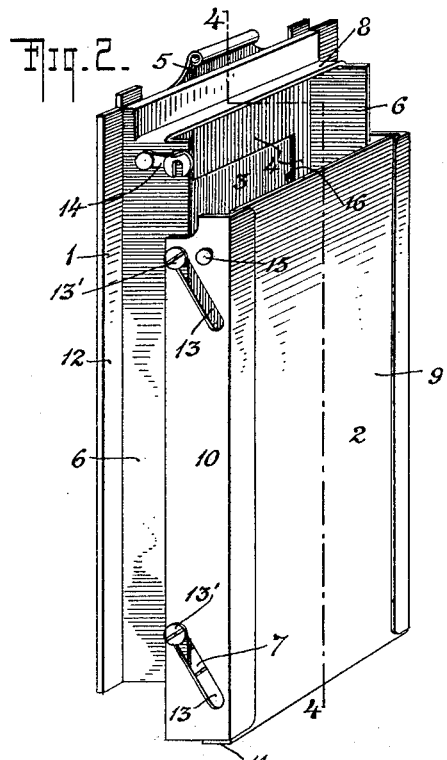
Figure 3:
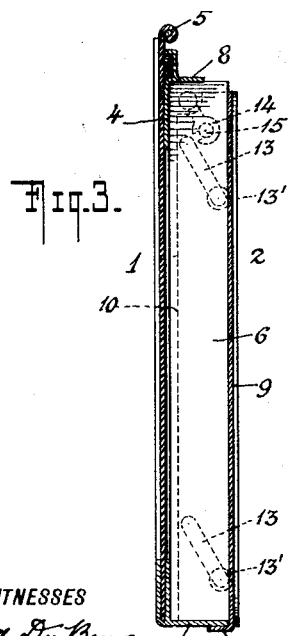
Figure 4:
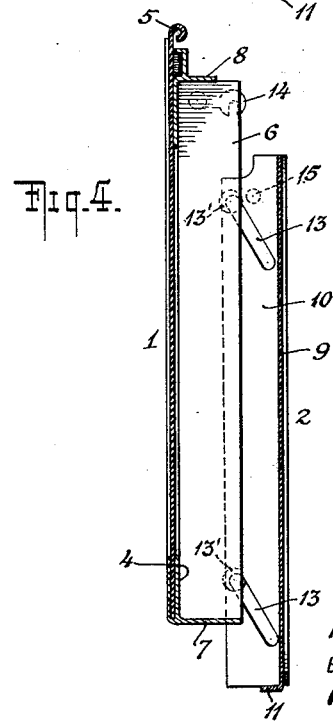

In the drawings, Figure 1 shows a perspective elevation of the adapter as it appears when closed; Fig. 2 is a view, similar to Fig. 1, showing the adapter open and ready to receive the film pack; Fig. 3 represents a central sectional elevation along the line 3—3 of Fig. 1; and Fig. 4 represents a similar elevation along the line 4—4 of Fig. 2.

Referring to the drawings, the adapter comprises relatively separable front and rear sections 1 and 2, the former constituting the holder proper for the film pack, while the latter constitutes a closure for said holder. The front section is provided with an exposure opening 3 bordered by flanges 4 and provided with an exposure controlling slide 5 arranged to open and control the exposure opening in the usual manner. The front section is provided with sides 6, a bottom 7 and a narrow top 8. The rear section 2 comprises substantially a flat back 9 provided with a flange 10 on each side and a bottom flange 11. The dimensions of the rear section, 2, are such that when the adapter is in closed position as in Figs. 1 and 3, side flanges 10 and bottom flange 11 will lie outside of but against the corresponding flanges 6 and 7 of the front section. The front section may be provided with extensions 12 on each side, said extensions being adapted to engage with suitable portions of the camera for holding the adapter in position. Or any other suitable means of attaching the adapter to the camera may be provided. Each flange 10 of the rear section is provided with slots 13, these slots all being parallel with one another and inclined downwardly and rearwardly. Screws or pins 13', one for each slot, are fixed in the flanges 6 of the front section, project through the slots, and are provided with heads which overlap the edges of the slots so as to hold the two sections permanently attached together. A hook 14 pivotally attached to each flange 6 near the top thereof and adapted to engage corresponding pins 15 suitably located upon the flanges 10 of the rear section serve to hold the two sections of the adapter in closed position (Figs. 1 and 3).

To use my improved adapter I proceed as follows: The two sections being closed and locked together (Figs. 1 and 3) the hooks 14, on each side, are pushed up from the pins 15. The rear section 2 may then be drawn rearwardly away from the front section 1 into the position shown in Figs. 2 and 4; during this movement the two sections will remain parallel to one another owing to the parallelism of the slots 13. The film pack is then inserted into the opening which exists at the top of the adapter owing to the fact that the rear section has no top flange and that the flange 8 of the front section is narrower than the side and bottom flanges 6 and 7. When the two sections are separated as described this opening will, if the adapter is suitably dimensioned, be sufficiently wide to permit the film pack to enter.

When the body of the film pack is below the upper flange, said pack is pushed forward so as to rest against the bordering flanges 8 and the rear section then moved forwardly upon the front section and the hooks 14 closed upon the pins 15. In this position the body of the film pack will be snugly held in the adapter as in a box with the film manipulating tabs projecting up and loosely through the opening 16. Since the body of the film pack has a thickness substantially equal to the distance between the bordering flanges 4 and the back 2 when the adapter is closed and since the width of the opening 16 is considerably less than this under the same conditions, it follows that the film pack cannot be withdrawn from the adapter when the latter is closed.

My adapter may be made of aluminum, brass or any other suitable material.

While I have shown a preferred form of my improved adapter, I do not confine myself to the specific form there shown as variations of detail may be made within the scope of the invention, and

I claim:

1. As an article of manufacture, a film pack adapter comprising a rectangular box of opaque material closed except at the front where there is an exposure opening and at one edge where there is an opening for film manipulating tabs, said box having two permanently connected but mutually separable sections and means for maintaining said sections parallel to one another as they are relatively moved.

2. A film pack adapter having an opening for film manipulating tabs and comprising a front section provided with an exposure opening, a rear section permanently attached thereto, means for separating and closing said sections as to one another while maintaining them parallel, and means for locking said sections together when closed.

3. As an article of manufacture, a film pack adapter comprising a rectangular box closed except at the front where there is an exposure opening and at one edge where there is an opening for film manipulating tabs, the front and back of said box having attached overlapping edge portions and being mutually separable but permanently connected, there being also means provided for maintaining said sections parallel to one another as they are relatively moved.

4. A film pack adapter comprising a front section provided with an exposure opening having bordering flanges, a rear section permanently attached to said front section, means for separating and closing said sections as to one another while maintaining them parallel and means for holding said sections together when closed said adapter being further provided with lateral and end flanges for engaging the body of the film pack and one of said flanges being narrower than the remaining flanges so as to accommodate the film manipulating tabs.

5. A film pack adapter comprising a front section provided with an exposure opening having bordering flanges, a rear section permanently attached to said front section, means for separating and closing said sections as to one another while maintaining them parallel said adapter being further provided with lateral and end flanges for engaging the body of the film pack and one of said flanges being narrower than the remaining flanges so as to accommodate the film manipulating tabs.

6. As an article of manufacture, a film pack adapter comprising a rectangular box closed except at the front where there is an exposure opening and at one edge where there is another opening, substantially narrower than the thickness of the box, for film manipulating tabs, the front and back of said box having attached overlapping edge portions and being mutually separable but permanently connected, there being also means provided for maintaining said sections parallel to one another as they are relatively moved.

In testimony whereof I have hereunto set my hand in the presence of two subscribing witnesses.

FREDERICK SCHMID.

Witnesses:
ELMER G. WILLYOUNG,
JOHN A. KEHLENBECK.

Copies of this patent may be obtained for five cents each, by addressing the "Commissioner of Patents, Washington, D. C."